(No Model.)
A. RUTENICK.
COFFEE POT AND FILTER.
No. 272,481. Patented Feb. 20, 1883.
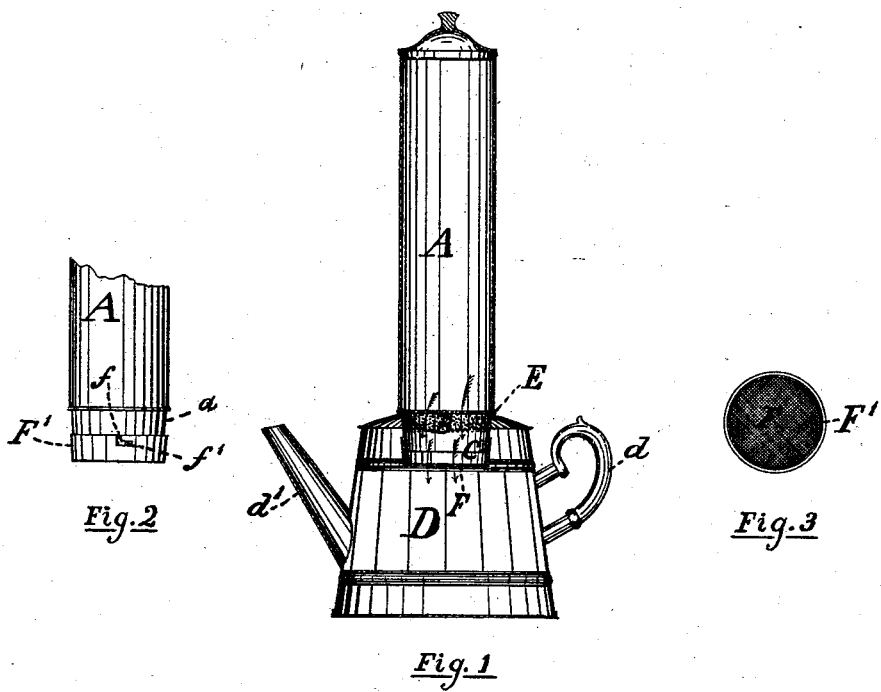
Witnesses.
Inventor.

UNITED STATES PATENT OFFICE.

ALBERT RUTENICK, OF NEW YORK, N. Y.

COFFEE-POT AND FILTER.

SPECIFICATION forming part of Letters Patent No. 272,481, dated February 20, 1883.

Application filed September 29, 1881. (No model.)

*To all whom it may concern:*

Be it known that I, ALBERT RUTENICK, of the city, county, and State of New York, have invented a new and useful Improvement in a Coffee-Pot and Filter; and I do hereby declare the following to be a full and clear description of the same.

This invention has for its object the preparation of a pure beverage from coffee by the well-known principle of the "French coffee-pot," in which the boiling water is placed in a reservoir above the coffee, and is allowed to percolate downward through it into the sub-reservoir or coffee-pot proper, the distinctive feature between the present invention and the old French coffee-pot being that in the present instance the hydrostatic pressure of the boiling water is added to the device by reason of constructing the upper or hot-water reservoir in the form of a stand-pipe, so as to cause the boiling water to act upon the coffee with a considerable pressure, so as to force its way downward through the coffee-reservoir, thereby acting not only more speedily, but also more thoroughly upon the coffee within the coffee-chamber, and thereby thoroughly extracting the valuable properties of the coffee, and sending them with the percolating water downward in a fluid form into the receptacle or coffee-pot below.

The invention also relates to a filtering-chamber and filtering material interposed between the hot-water reservoir and the coffee-chamber, so as to filter and thereby purify the water of which the coffee is to be made. This vessel with its filtering compartment may also be used for preparing tea as well as coffee, or it may be used as a simple water-filter.

The invention will be readily understood by reference to the accompanying drawings, of which—

Figure 1 is a central sectional elevation of one of the improved coffee-pots and filters. Fig. 2 is a side elevation of the bottom end of the stand-pipe section of the same, showing the construction of the removable cap at the lower end of the said stand-pipe. Fig. 3 is a plan of the bottom end of the stand-pipe, showing the strainer there placed.

This coffee-pot and filter consists of four distinct chambers, as follows: the stand-pipe or hot-water reservoir A, the filtering-chamber B, the coffee reservoir or chamber C, and the well or coffee-pot proper, D, the latter being a sub-chamber constructed, if desired, in the ordinary form of a coffee or tea pot. These chambers or compartments are separated from each other by the two transverse diaphragms E and F, as shown in Fig. 1, and each of these diaphragms will be perforated or formed of fine screen or gauze work, as shown in Fig. 3. These chambers or compartments can best be constructed in two vessels, the lower compartment or well, D, into which the coffee liquid is deposited, being in the form of a tea or coffee pot, with handle $d$, for facility of holding it up and tipping it, and spout $d'$, through which the coffee is poured out into cups, as required. The other vessel will contain the compartments A, B, and C, and will be constructed so as to fit into and be supported by the top of the lower vessel containing the chamber D. The upper vessel will be made to fit tightly into the neck or top of the lower vessel, so as to afford a firm union between the two vessels, and also to prevent the escape of the aroma of the coffee; yet the upper vessel will set into the lower vessel so as to be easily removed therefrom when the parts require to be separated for cleaning or other purposes. The upper vessel will represent a long tube or stand-pipe, $a$, the upper or principal chamber, A, of which will be of sufficient capacity to fill or nearly fill the lower chamber, D. The lower end of this stand-pipe will be partitioned off into the sub-chambers B and C by means of the transverse diaphragm or strainer E, which will be formed of a suitable perforated plate or wire-gauze, the edges of which must be tightly and securely fixed to the sides of the surrounding tube. The lower end of the cylindrical tube $a$ will be covered or partially closed by the cap or strainer F, which, like the diaphragm E, will be formed of a perforated plate or wire-gauze, the edges of which will be securely fixed to a surrounding annular piece, F', the interior diameter of which will be just sufficient to allow it to slide snugly onto the lower end of the pipe $a$, as shown in Figs. 1 and 2. In the top edge of the annular piece F', and on opposite sides thereof, there will be formed L-shaped locking-grooves *f*, which will slide onto locking-lugs *f'*, fixed respectively to the opposite sides of the tube *a*, near its lower end. By sliding this piece F' onto the lower end of the tube *a*, so as to allow the pins or lugs *f'* to enter the aforesaid grooves *f*, to the limit of their vertical opening, and then turning the cap-piece, so as to rotate the lateral arms of the slots *f* on the pins *f'* the two parts *a* and F F' will be securely fastened together, but yet in such a manner that the cap-piece F F' can be easily removed, as it will be on every occasion when the coffee-chamber C is to be filled or emptied, the tube *a* being required to be placed in an inverted position when the coffee is put into the chamber C until the cap F F' shall have been put on and properly locked in place, as above described, after which the tube may be turned over into its proper position, the perforated or gauze plate F forming a bottom for the coffee-compartment, and thereby holding the coffee in its proper chamber.

Just above the coffee-compartment, and below the diaphragm E, there will be placed a filtering material, B, consisting of paper-pulp, or paper softened to the consistency of pulp, or nearly so. This filtering material will be made to occupy about one-third (more or less) of the distance between the two perforated diaphragms E and F, and it will be held in place by simply clinging to the side of the tube *a*, it being slightly pressed in for that purpose.

The coffee-pot and filter being constructed as above described, the operation of it is very simple. The coffee, ground as in ordinary use, will be put into the chamber C, and the cap F F' securely fastened in place, as above described; then the tube *a* will be set into the top of the lower vessel, and the upper chamber, A, filled with boiling water, the top of A being provided with a movable cover for this purpose. The height of the tube *a* is such that a great hydrostatic pressure will be exerted upon the lower stratum, next the diaphragm E, and press it through both the filtering material B and the coffee C with great rapidity and force, and the result will be a beautiful, clear coffee, deprived of any impurities that may have been contained in the water by reason of the filter B, and with all of the strength and aroma of the coffee, by reason of the hydrostatic pressure used to drive the water through the coffee. The arrows indicate the direction in which the water flows through the two perforated diaphragms.

Having described my invention, I claim—

A coffee-pot having a hot-water reservoir, A, at its top, a filtering-chamber, B, below the said reservoir, a coffee-chamber, C, below the filter, a vessel, D, at the bottom for receiving the fluid extract, a strainer-diaphragm, E, interposed between the filtering-chamber and the coffee-chamber, a strainer-diaphragm between the coffee-chamber and fluid-extract receptacle, the L-shaped locking-grooves *f*, and the locking-lugs *f'*, substantially as described.

ALBERT RUTENICK.

Witnesses:
M. RANDOLPH,
J. B. THURSTON.